United States Patent
Bhatkar et al.

(10) Patent No.: US 9,652,616 B1
(45) Date of Patent: May 16, 2017

(54) TECHNIQUES FOR CLASSIFYING NON-PROCESS THREATS

(75) Inventors: Sandeep B. Bhatkar, Los Angeles, CA (US); Kent E. Griffin, Los Angeles, CA (US); Pratyusa Manadhata, Piscataway, NJ (US)

(73) Assignee: Symantec Corporation, Mountain View, CA (US)

( * ) Notice: Subject to any disclaimer, the term of this patent is extended or adjusted under 35 U.S.C. 154(b) by 529 days.

(21) Appl. No.: 13/047,281

(22) Filed: Mar. 14, 2011

(51) Int. Cl.
*G06F 21/56* (2013.01)

(52) U.S. Cl.
CPC ............ *G06F 21/566* (2013.01); *G06F 21/56* (2013.01)

(58) Field of Classification Search
CPC ............. H04L 63/1416; H04L 63/1425; H04L 63/1408; H04L 63/145; H04L 63/0853; G06F 21/554; G06F 21/552
See application file for complete search history.

(56) References Cited

U.S. PATENT DOCUMENTS

| | | | | |
|---|---|---|---|---|
| 6,636,972 | B1* | 10/2003 | Ptacek et al. | 726/6 |
| 6,779,117 | B1* | 8/2004 | Wells | G06F 21/51 709/223 |
| 7,698,740 | B2* | 4/2010 | Oka et al. | 726/22 |
| 7,971,255 | B1* | 6/2011 | Kc et al. | 726/24 |
| 8,161,548 | B1* | 4/2012 | Wan | 726/22 |
| 8,544,087 | B1* | 9/2013 | Eskin et al. | 726/22 |
| 2003/0191942 | A1* | 10/2003 | Sinha et al. | 713/181 |
| 2005/0172338 | A1* | 8/2005 | Sandu et al. | 726/22 |
| 2006/0130141 | A1* | 6/2006 | Kramer et al. | 726/23 |
| 2006/0150256 | A1* | 7/2006 | Fanton | G06F 21/10 726/27 |
| 2006/0191008 | A1* | 8/2006 | Fernando et al. | 726/23 |
| 2006/0288420 | A1* | 12/2006 | Mantripragada et al. | 726/25 |
| 2007/0150957 | A1* | 6/2007 | Hartrell et al. | 726/24 |
| 2007/0192863 | A1* | 8/2007 | Kapoor et al. | 726/23 |
| 2008/0016339 | A1* | 1/2008 | Shukla | G06F 21/53 713/164 |
| 2009/0049549 | A1* | 2/2009 | Park et al. | 726/22 |
| 2009/0158430 | A1* | 6/2009 | Borders | 726/23 |
| 2010/0064369 | A1* | 3/2010 | Stolfo et al. | 726/24 |
| 2010/0192222 | A1* | 7/2010 | Stokes et al. | 726/22 |
| 2010/0205669 | A1* | 8/2010 | Mantripragada et al. | 726/22 |
| 2010/0251371 | A1* | 9/2010 | Brown | 726/23 |

(Continued)

OTHER PUBLICATIONS

Gaurav S. Kc, Angelos D. Keromytis, and Vassilis Prevelakis, Countering Code-Injection Attacks With Instruction-Set Randomization, CCS '03, Oct. 27-31, 2003, Washington, DC, USA; ACM 1-58113-738-9/03/0010.*

*Primary Examiner* — Samson Lemma
*Assistant Examiner* — Carlos Amorin
(74) *Attorney, Agent, or Firm* — Wilmer Cutler Pickering Hale and Dorr LLP

(57) ABSTRACT

Techniques for classifying non-process threats are disclosed. In one particular exemplary embodiment, the techniques may be realized as a method for classifying non-process threats comprising generating trace data of at least one observable event associated with execution of a process, representing a first feature of the at least one observable event of the trace data, calculating, using a computer processor, a similarity between the first feature and at least one sample feature, and classifying the process based on the similarity.

16 Claims, 7 Drawing Sheets

(56) References Cited

U.S. PATENT DOCUMENTS

| | | | |
|---|---|---|---|
| 2010/0257253 A1* | 10/2010 | Saha | G06F 9/44589 709/217 |
| 2010/0306851 A1* | 12/2010 | Zhou | 726/25 |
| 2011/0041179 A1* | 2/2011 | St hlberg | 726/23 |
| 2011/0197281 A1* | 8/2011 | Alme et al. | 726/24 |
| 2011/0271341 A1* | 11/2011 | Satish et al. | 726/23 |
| 2011/0271343 A1* | 11/2011 | Kim et al. | 726/23 |
| 2011/0283361 A1* | 11/2011 | Perdisci et al. | 726/24 |
| 2011/0289586 A1* | 11/2011 | Kc et al. | 726/24 |
| 2012/0059899 A1* | 3/2012 | Kashi et al. | 709/212 |
| 2012/0079596 A1* | 3/2012 | Thomas et al. | 726/24 |
| 2012/0084859 A1* | 4/2012 | Radinsky et al. | 726/23 |
| 2012/0089481 A1* | 4/2012 | Iozzia et al. | 705/26.41 |
| 2012/0137367 A1* | 5/2012 | Dupont et al. | 726/25 |
| 2012/0167223 A1* | 6/2012 | Di Crescenzo et al. | 726/24 |
| 2012/0185930 A1* | 7/2012 | Desai et al. | 726/13 |
| 2012/0227105 A1* | 9/2012 | Friedrichs et al. | 726/22 |
| 2014/0053263 A1* | 2/2014 | Muttik et al. | 726/22 |

\* cited by examiner

TECHNIQUES FOR CLASSIFYING NON-PROCESS THREATS

FIELD OF THE DISCLOSURE

The present disclosure relates generally to classifying malware and, more particularly, to techniques for classifying non-process threats.

BACKGROUND OF THE DISCLOSURE

Malware threats continue to grow in a large part due to polymorphic and metamorphic threats (e.g., malware variants with the same behavior but a different signature). Classifying malware may be important in order to efficiently identify remedies and/or security measures for variants and to identify new malware. Some types of malware such as, for example, non-process threats (NPTs), may be a challenge to classification. Non-process threats may use existing benign processes and/or utilities to perform one or more malicious actions. Improper classification of non-process threats may incorrectly associate an operating system utility, an interpreter, and/or a benign process (e.g., a word processor or a web browser) with malware. For example, a non-process threat may inject and execute code into a memory space of an existing process associated with a benign process. The non-process threat may then create a remote thread associated with the benign process to perform one or more malicious actions. Attempts to handle the malicious actions may incorrectly associate the malicious actions with the benign process.

Similar difficulties may exist with other non-process threats such as, for example, the execution of malicious scripts using a benign utility and/or interpreter such as, for example, perl.exe and cmd.exe. Other non-process threats which may provide a challenge include malicious Dynamic Linked Libraries (DLLs) which may be loaded by a process or a utility such as rundll132.exe and svchost.exe.

In view of the foregoing, it may be understood that there may be significant problems and shortcomings associated with current technologies for classifying non-process threats.

SUMMARY OF THE DISCLOSURE

Techniques for classifying non-process threats are disclosed. In one particular exemplary embodiment, the techniques may be realized as a method for classifying non-process threats comprising generating trace data of at least one observable event associated with execution of a process, representing a first feature of the at least one observable event of the trace data, calculating, using a computer processor, a similarity between the first feature and at least one sample feature, and classifying the process based on the similarity.

In accordance with other aspects of this particular exemplary embodiment, representing the first feature may comprise generating a feature vector.

In accordance with further aspects of this particular exemplary embodiment, the data associated with the at least one observable event may comprise n-gram data.

In accordance with additional aspects of this particular exemplary embodiment, the similarity may comprise an Euclidean distance.

In accordance with additional aspects of this particular exemplary embodiment, representing the first feature may comprise a set of elements including operating system operations and objects; and wherein the similarity comprises a Jaccard index.

In accordance with additional aspects of this particular exemplary embodiment, the techniques may further comprise associating the trace file with a hash of an executable of the process.

In accordance with additional aspects of this particular exemplary embodiment, the techniques may further comprise tracing observable events of a thread injected by a process, generating a second feature vector of the injected thread using n-grams associated with observable events of the injected thread trace data, and calculating a combined feature vector combining the first and second feature vectors.

In accordance with additional aspects of this particular exemplary embodiment, the Euclidean distance may be calculated using the combined feature vector.

In accordance with additional aspects of this particular exemplary embodiment, the process executed may comprise an interpreter running a malware script.

In accordance with additional aspects of this particular exemplary embodiment, the techniques may further comprise identifying a script file associated with the process executed by the interpreter, and associating the trace data with the script file.

In accordance with additional aspects of this particular exemplary embodiment, the script file may be identified using command line arguments provided during the execution of the script file.

In accordance with additional aspects of this particular exemplary embodiment, a Dynamic Linked Library (DLL) may host the process.

In accordance with additional aspects of this particular exemplary embodiment, the received trace data of the at least one observable event may be associated with execution of a process executed within the context of the DLL.

In accordance with additional aspects of this particular exemplary embodiment, the techniques may further comprise determining the context of the DLL by traversing an execution stack to verify that a return address on the execution stack corresponds to virtual address space associated with a code section of the DLL.

In accordance with additional aspects of this particular exemplary embodiment, the DLL may be loaded by an Operating System (O/S) utility.

In accordance with additional aspects of this particular exemplary embodiment, the operating system utility may comprise at least one of: svchost.exe and rundll132.exe.

In accordance with additional aspects of this particular exemplary embodiment, the techniques may further comprise obtaining information about the DLL using at least one of: a command line argument and a registry setting, and associating the trace file with the DLL.

In accordance with additional aspects of this particular exemplary embodiment, the techniques may be realized as at least one processor readable non-transitory storage medium for storing a computer program of instructions configured to be readable by at least one processor for instructing the at least one processor to execute a computer process for performing the method.

In another particular exemplary embodiment, the techniques may be realized as an article of manufacture for classifying non-process threats, the article of manufacture comprising at least one non-transitory processor readable medium and instructions stored on the at least one medium. The instructions may be configured to be readable from the at least one medium by at least one processor and thereby cause the at least one processor to operate so as to: generate trace data of at least one observable event associated with execution of a process, generate a first feature vector of the process containing data associated with the at least one observable event of the trace data, calculate a similarity between the first feature vector and at least one sample vector, and classify the process based on the similarity.

In yet another particular exemplary embodiment, the techniques may be realized as a system for classifying non-process threats comprising: one or more processors communicatively coupled to a network. The one or more processors may be configured to: generate trace data of at least one observable event associated with execution of a process, generate a first feature vector of the process containing data associated with the at least one observable event of the trace data, calculate a similarity between the first feature vector and at least one sample vector, and classify the process based on the similarity.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
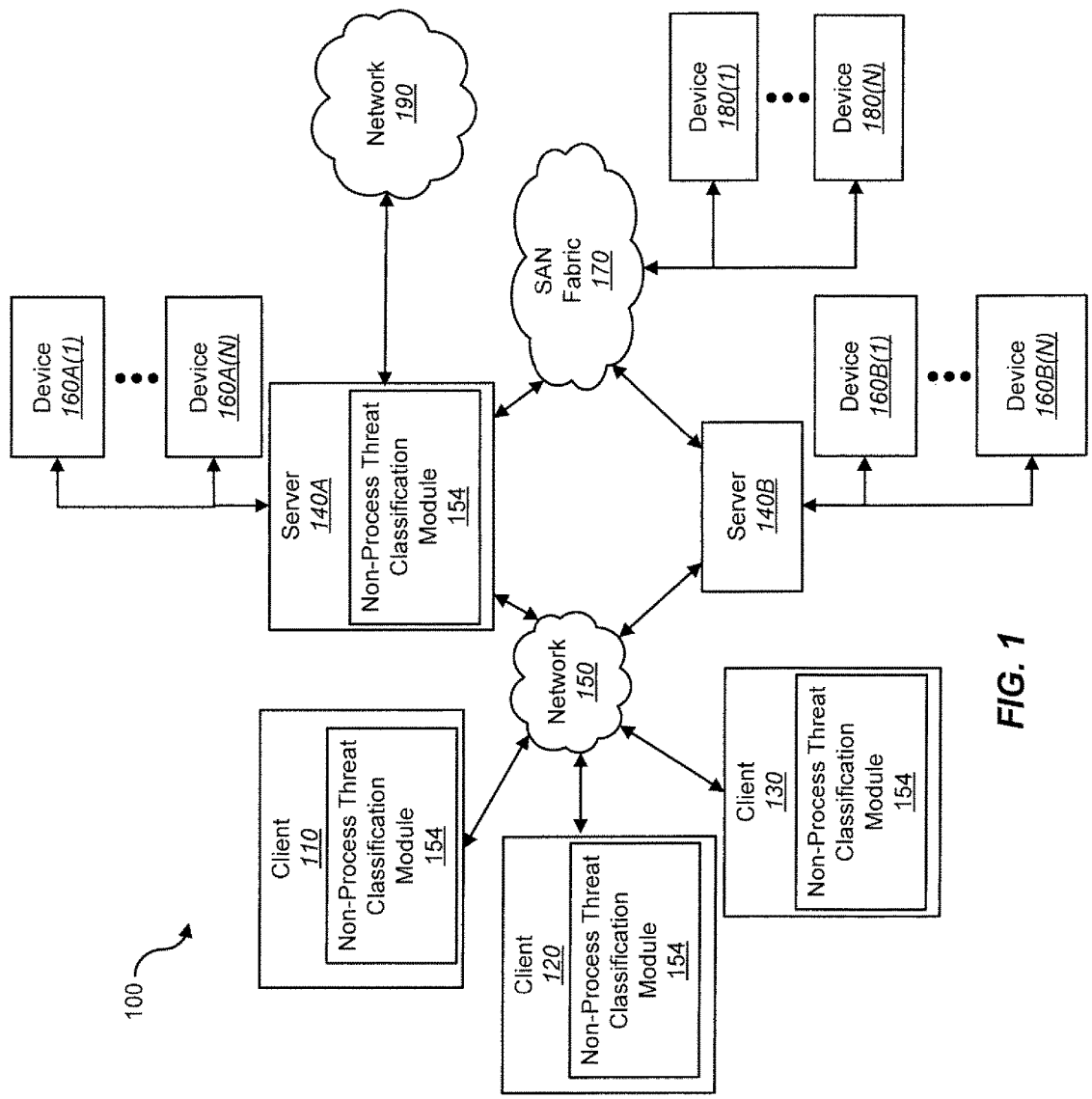
FIG. 1 shows a block diagram depicting a network architecture for classifying non-process threats in accordance with an embodiment of the present disclosure.

FIG. 1 shows a block diagram depicting a network architecture 100 for classifying non-process threats in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., non-process threat classification module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150. Server 140A may be communicatively coupled to network 190.

The description below describes network elements, computers, and/or components of a system and method for classifying non-process threats that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 2:
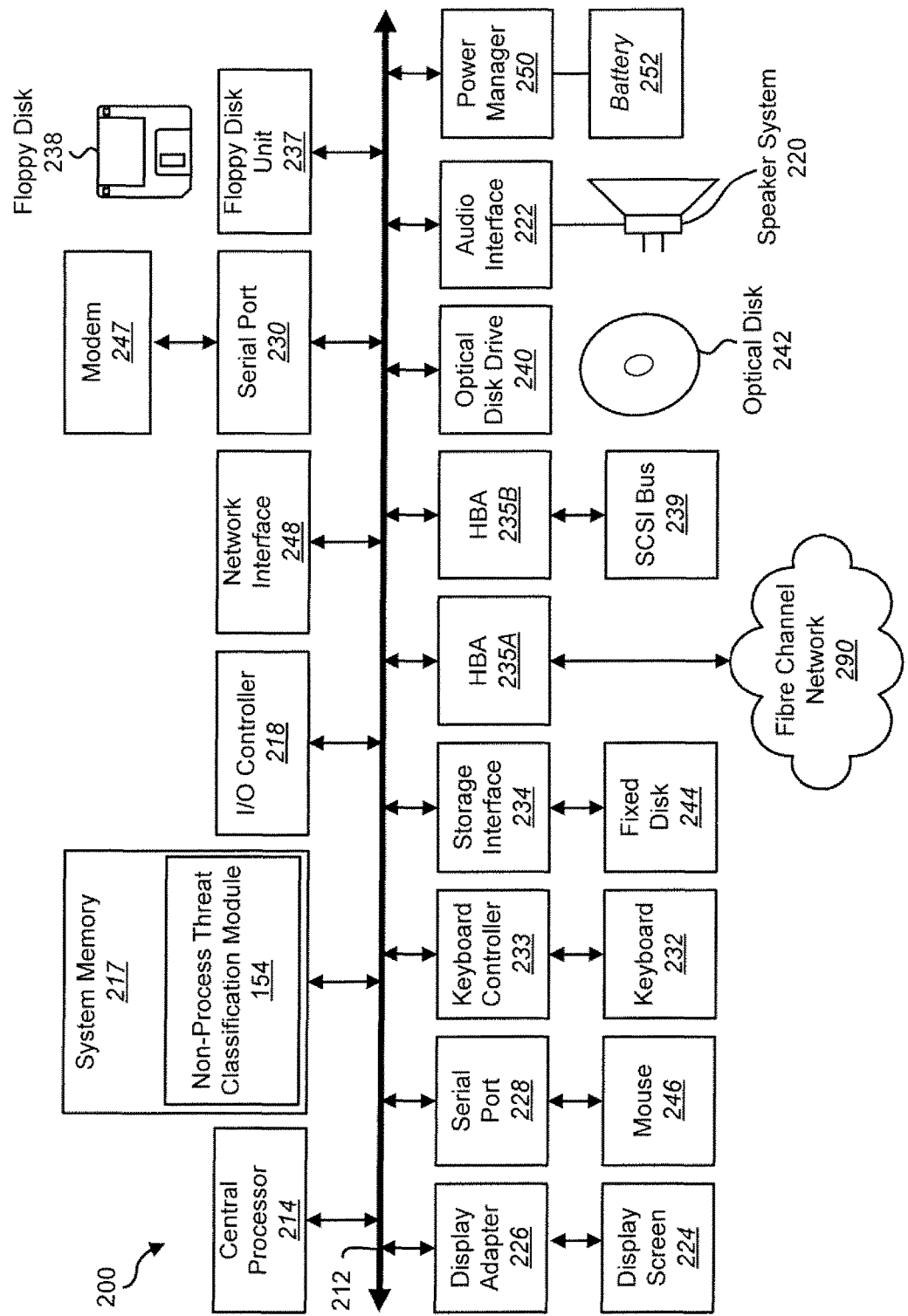
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software. Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180 (1)-(N) may be network accessible storage and may be local, remote, or a combination thereof to server 140A or 140B.

Storage devices 160A(1)-(N), 160B (1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for classifying non-process threats such as, for example, non-process threat classification module 154. As illustrated, one or more portions of non-process threat classification module 154 may reside at a client. One or more portions of non-process threat classification module 154 may reside at a network centric location. For example, server 140A may be a server, a firewall, a proxy server, a gateway, a search engine, or other network element that may perform one or more actions to analyze process behavior. According to some embodiments, network 190 may be an external network (e.g., the Internet) and server 140A may be a gateway, a proxy server, a search engine, and/or a firewall between one or more internal components and clients and the external network.

According to some embodiments, non-process threat classification module 154 may be implemented in several portions which may be co-located or located remote from one another. According to one or more embodiments, non-process threat classification may be performed by a third party (e.g., a service provider and/or a security software vendor). Results of non-process threat classification may be provided to one or more clients.

According to some embodiments, clients 110, 120, and/or 130 may contain one or more modules of non-process threat classification module 154. If a process, file, and/or data is indicated as malicious one or more modules of non-process threat classification module 154 residing on a client may deny access to the malware associated content, may provide a warning associated with the malware associated content, and/or may activate security software to address a malware threat. For example, a component of non-process threat classification module 154 may perform one or more actions to protect a user from detected malware.

According to some embodiments, non-process threat classification module 154 may receive or generate a trace file of system calls, execution history, and/or API calls produced during the execution of suspected malware. A trace file may be, for example, a sequence of APIs that are invoked from one or more processes and/or remotely injected threads resulting from the execution of a sample of suspected malware. A trace file may include context information such as process id, thread id, and/or a sequence number to indicate ordering among calls (e.g., API calls and/or system calls). According to some embodiments, trace files may be generated by running suspected malware in a safe environment (e.g., a sandboxed virtual machine). Non-process threat classification module 154 may classify files including both malware and benign processes for better organization and cataloging of process samples into more meaningful behavior-based categories such as rootkits, keyloggers, bots, etc. Non-process threat classification module 154 may allow and/or provide sharing threat behaviors with customers and/or partners.

Determining similarity among samples (PE executables) based on their runtime behavior may be performed in order to classify samples. Non-process threats (NPTs) may be more difficult to classify because NPTs may hide their malicious behavior within existing legitimate processes such as word processors or web browsers. To address these threats, Non-process threat classification module 154 may capture precise behavioral features that may be suitable for determining similarity with high accuracy.

Non-process threat classification module 154 may determine similarity among samples based on their runtime behavior (e.g., API calls and/or system calls). Non-process threat (NPT) samples, which may account for 10 to 20 percent of malware, may be more difficult to classify because NPTs may hide their malicious behavior in the existing processes belonging to popular, trusted programs such as, for example, word processors and web browsers. For example, on the Windows platform, a malware program may first allocate memory in an existing legitimate process, copy malicious code in the memory, and then start a remote thread in the target process (using the API call CreateRemoteThread). Attempts to classify malware by simply looking at the calls of the malware process may not obtain sufficient behavior because a majority of the behavior may be performed in the context of the benign process. Other types of NPTs may pose similar challenges. For example, DLLs and script files, which may be interpreted and/or executed by trusted programs such as rundll132.exe, svchost.exe, and cmd.exe, may hide malicious behavior in the context of a trusted program. Non-process threat classification module 154 may precisely capture similarity among NPT samples.

According to some embodiments, in order to measure similarity, non-process threat classification module 154 may use features comprising of N-grams of APIs observed at runtime. An n-gram may be a subsequence of n items from a given sequence. For instance, if a process thread produces APIs a1, a2, a3, a4, and a5 in that chronological order, non-process threat classification module 154 may capture and/or receive the temporal ordering in the form of the following 3-grams: (a1, a2, a3), (a2, a3, a4), and (a3, a4, a5). Non-process threat classification module 154 may extract N-grams for one or more of the threads in a process. According to some embodiments, an N-gram may not cross thread boundaries. Non-process threat classification module 154 may represent each sample with a feature vector that may contain Boolean valued elements corresponding to the occurrence of all possible N-grams. According to some embodiments, Non-process threat classification module 154 may classify a sample based upon similarity to one or more other samples. For example, Non-process threat classification module 154 may measure similarity using Euclidean distance as the distance metric.

According to some embodiments, non-process threat classification module 154 may generate a set of elements to represent a point of data based Operating System (O/S) operations and objects. This set of data may be compared against test sample sets of data using the Jaccard index to compute the distance. The distance may be a measure of similarity between the sample file (i.e., the suspected file) and the test sample (i.e., previously classified file).

Non-process threat classification module 154 may use one or more techniques to ensure a trace file contains the appropriate calls (e.g., includes only API calls initiated by the malware and not a benign process or O/S utility program such as rundll32.exe and svchost.exe).

For example, to address NPTs that inject remote threads Non-process threat classification module 154 may use API hooking that maintains the appropriate context and that considers both the malware process and any injected threads. For the main malware process, Non-process threat classification module 154 may use an API hooking library to extract an API trace A_p, and may generate feature vector F_p. The API trace A_p may be associated with a hash (e.g., SHA-256) of an executable corresponding to the malware process. Whenever the malware process injects a remote thread in a benign process, Non-process threat classification module 154 may inject a hooking library into the target process using a kernel driver. However, within this benign process, the hooking library may log APIs only if the APIs are invoked from the context of the injected thread or a descendant of the injected thread; other threads may be ignored because they belong to the valid process. Non-process threat classification module 154 may use a kernel driver to make a process id of the source process (i.e., the malware process), available to the hooking library. Non-process threat classification module 154 may use the process id to associate the API trace A_t of the target process with the malware program executable. Non-process threat classification module 154 may extract feature vector F_t corresponding to A_t. Non-process threat classification module 154 may then compute the feature vector F by combining vectors F_p and F_t with an OR operation, (i.e., each element in F may represent an OR of the corresponding elements in F_p and F_t). This may have the effect of combining behaviors from the malware process as well as its remote thread. Finally, non-process threat classification module 154 may use the feature vector F for similarity computation (e.g., Euclidean distance computation).

Non-process threat classification module 154 may handle non-Portable Executable (PE) file NPTs, such as scripts by associating the trace file of an interpreter process with the threat file and not the interpreter's executable. The threat file information may be found in command line arguments of the interpreter processes such as, for example, in perl.exe and cmd.exe command line arguments.

Non-process threat classification module 154 may address a DLL threat by logging calls of the process hosting the DLL only if the calls are invoked from the context of that DLL. When a call is invoked, the DLL context may be established by traversing an execution stack and checking if a return address on the execution stack belongs to the virtual address space where the DLL's code section is mapped. This may allow Non-process threat classification module 154 to extract features specific to a DLL and use it for similarity.

For a DLL that is run using programs such as, for example, rundll32.exe or svchost.exe, Non-process threat classification module 154 may simply extract the N-gram features corresponding to the entire process, but associate the features with the DLL file (not the program used to run the DLL). These executables may not have much of their own behavior; they simply load and execute code in the host DLL, which is the main source of the behavior. In these cases, the information about the DLL being run may be obtained from command-line arguments and/or registry settings.

Non-process threat classification module 154 may provide malware labeling including performing multi-class classification to identify families of malicious as well benign or trusted programs. Based on behavioral characteristics, Non-process threat classification module 154 may assign an unknown sample to an appropriate cluster and then derive the label of the sample from a label of the cluster. Non-process threat classification module 154 may be highly scalable and perform labeling with a high degree of accuracy. By precisely capturing runtime behaviors into a feature vector that is suitable for clustering, Non-process threat classification module 154 may reduce classification false positives and improve accuracy.

According to some embodiments, Non-process threat classification module 154 may be utilized with a different choice of feature types and distance metrics. For instance, instead of N-gram, Non-process threat classification module 154 may extract each feature as a set (e.g., a set of elements corresponding to OS operations and object names). In the case of remote code injection threats, the features of the malware process and its injected thread may be combined by a set union operation. For similarity between feature sets, Jaccard index may be used as the distance metric. Other alternative comparison feature sets and similarity measures may be used.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, non-process threat classification module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an Internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
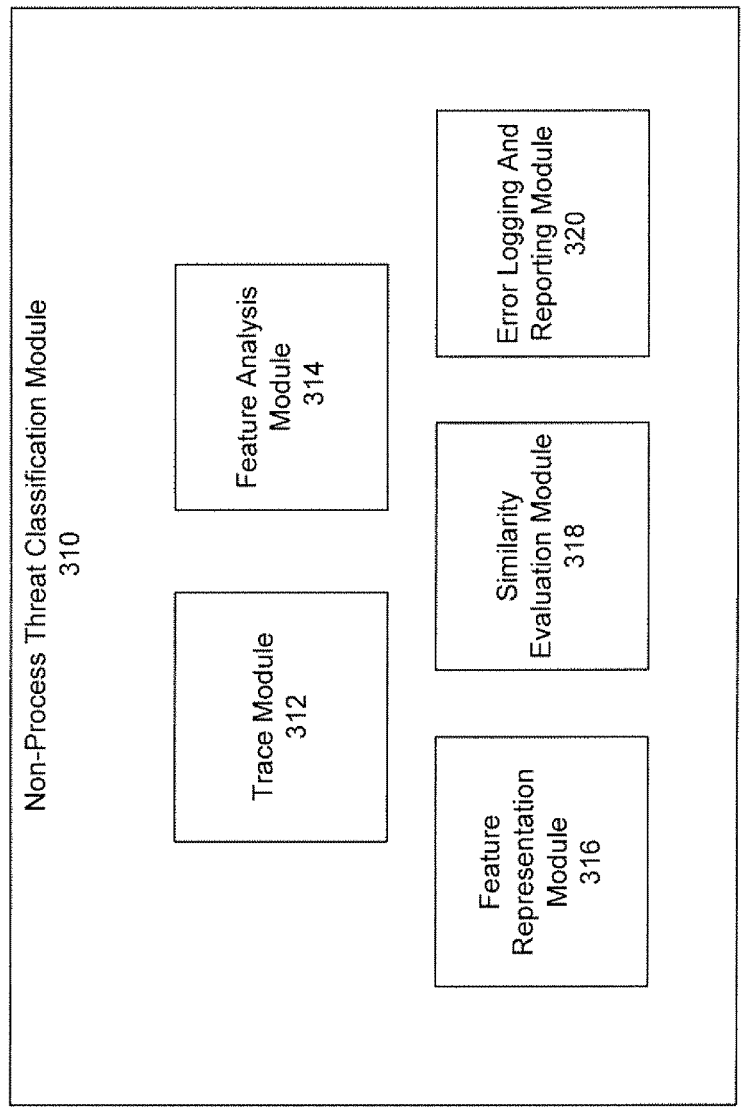
FIG. 3 shows a module for classifying non-process threats in accordance with an embodiment of the present disclosure.

Referring to FIG. 3, there is shown a non-process threat classification module 310 in accordance with an embodiment of the present disclosure. As illustrated, the non-process threat classification module 310 may contain one or more components including trace module 312, feature analysis module 314, feature representation module 316, similarity evaluation module 318, and error logging and reporting module 320.

Trace module 312 may generate a trace of API calls during execution of a sample. According to some embodiments, a sample may be executed in a safe environment such as, for example, a sandboxed virtual machine. According to one or more embodiments, trace module 312 may generate trace files of a client or server running in a production environment. Trace module 312 may also provide traces of programs for analysis by copying and/or intercepting programs at a firewall, proxy server, or another intermediary device. According to one or more embodiments, Trace module 312 may provide formatting and/or processing on a generated trace file.

Feature analysis module 314 may identify features of calls from a trace file to use for classification of a sample. According to some embodiments, feature analysis module 314 may use features comprising of N-grams of calls observed at runtime. For example, if a process thread produces APIs a1, a2, a3, a4, and a5 in that chronological order, Feature analysis module 314 may capture and/or receive the temporal ordering in the form of the following 3-grams: (a1, a2, a3), (a2, a3, a4), and (a3, a4, a5). Feature analysis module 314 may extract N-grams for one or more of the threads in a process. According to some embodiments, an N-gram may not cross thread boundaries. According to some embodiments, feature analysis module 314 may extract each feature as a set (e.g., a set of elements corresponding to OS operations and object names).

Feature representation module 316 may represent each sample with a feature vector that may contain Boolean valued elements corresponding to the occurrence of all possible N-grams. In the case of samples using injected threads, Feature representation module 316 may generate vectors for injected threads (and any descendants) as well as for a malware process injecting threads. Feature representation module 316 may combine behaviors from the malware process as well as its remote thread (e.g., by combining vectors with an OR operation).

According to some embodiments, Feature representation module 316 may generate a set of elements to represent a point of data based Operating System (O/S) operations and objects. This set of data may be compared against test sample sets of data using the Jaccard index to compute the distance. The distance may be a measure of similarity between the sample file (i.e., the suspected file) and the test sample (i.e., previously classified file).

Similarity evaluation module 318 may classify a sample based upon similarity to one or more other samples. For example, Similarity evaluation module 318 may measure similarity using Euclidean distance as the distance metric.

According to some embodiments, similarity evaluation module 318 may also use sets of data instead of vectors and may compare the sets of data against test sample sets of data using the Jaccard index to compute the distance.

Error logging and reporting module 320 may produce logs, reports, or other information associated with classifying non-process threats.

Figure 4:
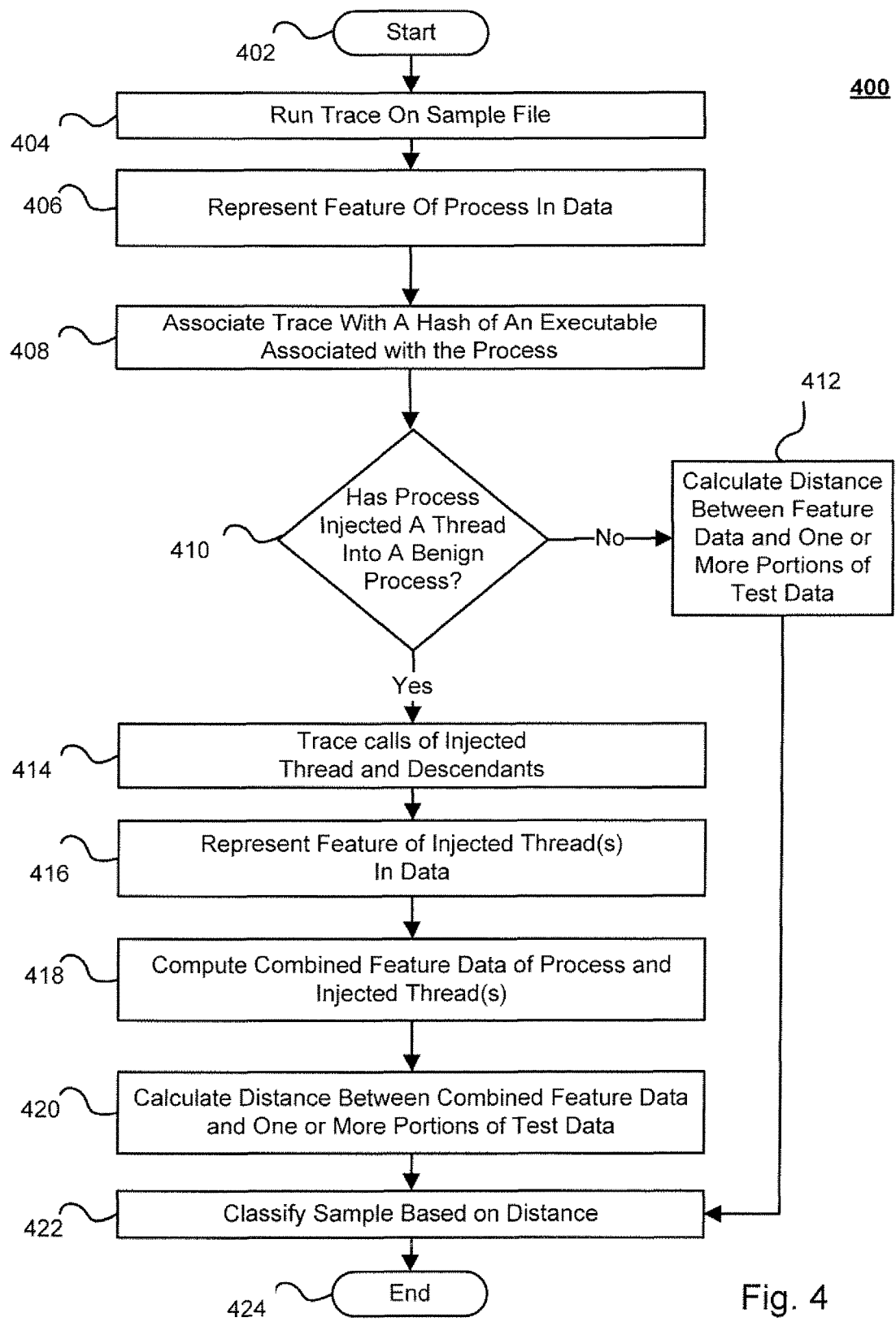
FIG. 4 depicts a method for classifying non-process threats in accordance with an embodiment of the present disclosure.

Referring to FIG. 4, there is depicted a method 400 for classifying non-process threats in accordance with an embodiment of the present disclosure. At block 402, the method 400 may begin. According to some embodiments, method 400 may be a process for classifying samples suspected to be malware using thread injection into benign processes.

At block 404, a trace file may be received and/or tracing may be performed on a sample file. Tracing may include identifying observable events including, but not limited to, API calls and/or system calls. For example, a trace may be performed using a user level hooking in a secure environment such as a sandboxed virtual machine. A trace file may be normalized and/or further prepared for analysis.

At block 406, one or more features of the process may be represented as data. For example, a feature vector of a sample process (e.g., a suspected malware process) may be generated using one or more methods. According to some embodiments, n-grams associated with calls may be used. According to some embodiments, operating system calls and objects may be data points represented as sets of data.

At block 408, a trace file may be associated with a hash of an executable file associated with the suspected malware process.

At block 410, it may be determined whether the suspected malware has injected one or more threads into a benign or trusted process. If it has injected one or more threads, the process may continue at block 414. If it has not injected one or more threads, the process may continue at block 411.

At block 412, the vector calculated based on the suspected malware may be compared with the samples (e.g., the vector calculated in block 406). According to some embodiments, Euclidean distance may be used to calculate similarity between vectors. The sample vectors compared with the suspected malware vector(s) may be previously classified samples associated with known malware. According to embodiments using sets of data instead of vectors, similarity may be measured using the Jaccard index to compute a distance.

At block 414, calls of the one or more injected processes may be traced. The context of the calls may be watched to ensure that they are calls instantiated by the injected threads and not threads instantiated by the benign process.

At block 416, a feature vector may be generated for the one or more injected threads using N-grams or other features associated calls in the traces of the injected threads. According to some embodiments, operating system calls and objects of the injected threads may be data points represented as sets of data.

At block 418, the combined vector of the malware process and any injected threads may be calculated. In embodiments using feature vectors a vector OR operation may be used to combine the vectors. In embodiments using sets of data, sets of data may be combined using a set UNION operation.

At block 420, similarity between the combined vector and one or more sample vectors may be calculated. According to some embodiments, Euclidean distance may be used to calculate similarity. The sample vectors compared with the suspected malware vector(s) may be previously classified samples associated with known malware. According to embodiments using sets of data instead of vectors, similarity may be measured using the Jaccard index.

At block 422, the suspected malware sample may be classified based on distance. Classification may involve a training sample set including both benign and malicious samples. Classification may also involve clustering analysis to match a sample against a plurality of known test samples. Clustering analysis may classify a sample as benign, malicious, and/or unknown based at least in part on a distance from the sample to a plurality of test samples.

At block 424, the method may end.

Figure 5:
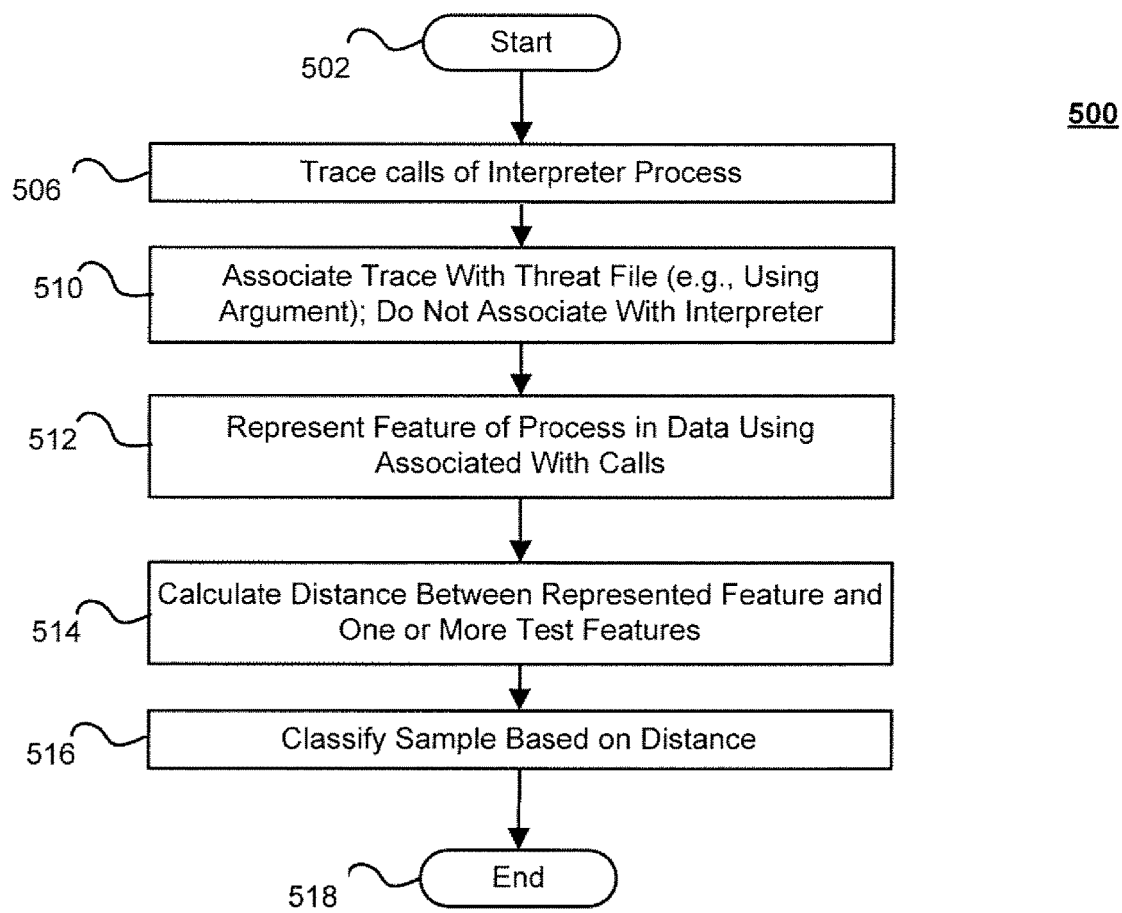
FIG. 5 depicts a method for classifying non-process threats associated with interpreted processes in accordance with an embodiment of the present disclosure.

FIG. 5 depicts a method for classifying non-process threats associated with interpreted processes in accordance with an embodiment of the present disclosure. At block 502, the method may start.

At block 506, a trace file may be received and/or tracing may be performed on a sample file. Tracing may be performed using a user level hooking in a secure environment such as a sandboxed virtual machine. A trace file may be normalized and/or further prepared for analysis.

At block 510, a generated trace file may be associated with a suspected threat or malware file (e.g., a script file) and not an interpreter. For example, the trace file may be associated with a suspected perl script, but not with perl.exe (the interpreter).

At block 512, a feature vector of a sample process (e.g., a suspected malware process) may be generated using one or more methods. According to some embodiments, n-grams associated with API calls may be used. According to some embodiments, features of the sample process may be data points represented as sets of data.

At block 514, similarity between the sample data and one or more test samples may be calculated. According to some embodiments, Euclidean distance may be used to calculate similarity between vectors. A Jaccard index may be used to calculate distance between sets of data. The test sample data compared with the suspected malware sample may be previously classified samples associated with known malware.

At block 516, the suspected malware sample may be classified based on distance. Classification may involve a training sample set including both benign and malicious samples. Classification may also involve clustering analysis to match a sample against a plurality of known test samples. Clustering analysis may classify a sample as benign, malicious, and/or unknown based at least in part on a distance from the sample to a plurality of test samples.

At block 518, the method may end.

Figure 6:
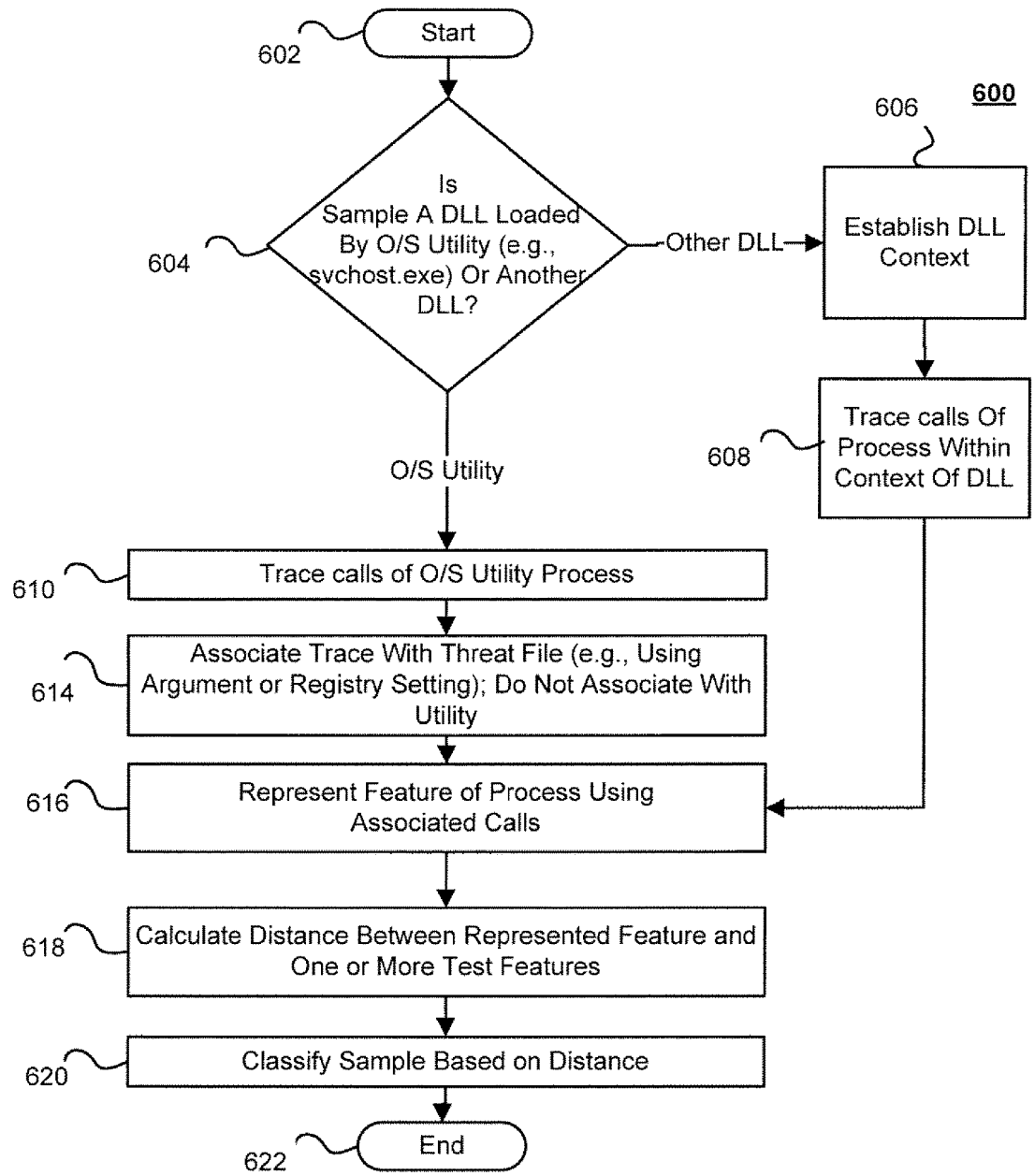
FIG. 6 depicts a method for classifying non-process threats in accordance with an embodiment of the present disclosure.

FIG. 6 depicts a method for classifying non-process threats in accordance with an embodiment of the present disclosure. At block 602, the method may start.

At block 604, it may be determined whether the sample is a DLL or other interpreted file (e.g., a perl file). If the sample is a script, the method may continue at block 610. If the sample is not a script, the method may end at block 622.

At block 606, DLL context may be determined. When a call is made (e.g., invoking an API or making a system call), the DLL context may be established by traversing an execution stack and checking if a return address on the execution stack belongs to the virtual address space where the DLL's code section is mapped. This may allow tracing of only malware instantiated calls.

At block 608, calls of a suspected malware process may be traced within the context of the DLL.

At block 610, a trace file may be received and/or tracing may be performed on a sample file. A trace may be performed using user level hooking in a secure environment such as a sandboxed virtual machine. A trace file may be normalized and/or further prepared for analysis.

At block 614, a generated trace file may be associated with a suspected threat or malware file (e.g., a DLL file).

At block 616, a feature vector of a sample process (e.g., a suspected malware process) may be generated using one or more methods. According to some embodiments, n-grams associated with API calls may be used. According to some embodiments, features of the sample process may be data points represented as sets of data.

At block 618, similarity between the vector and one or more sample vectors may be calculated. According to some embodiments, Euclidean distance may be used to calculate similarity between vectors. A Jaccard index may be used to calculate distance between sets of data. The sample vectors compared with the suspected malware vector(s) may be previously classified samples associated with known malware.

At block 620, the suspected malware sample may be classified based on distance. Classification may involve a training sample set including both benign and malicious samples. Classification may also involve clustering analysis to match a sample against a plurality of known test samples. Clustering analysis may classify a sample as benign, malicious, and/or unknown based at least in part on a distance from the sample to a plurality of test samples.

At block 622, the method may end.

Figure 7:
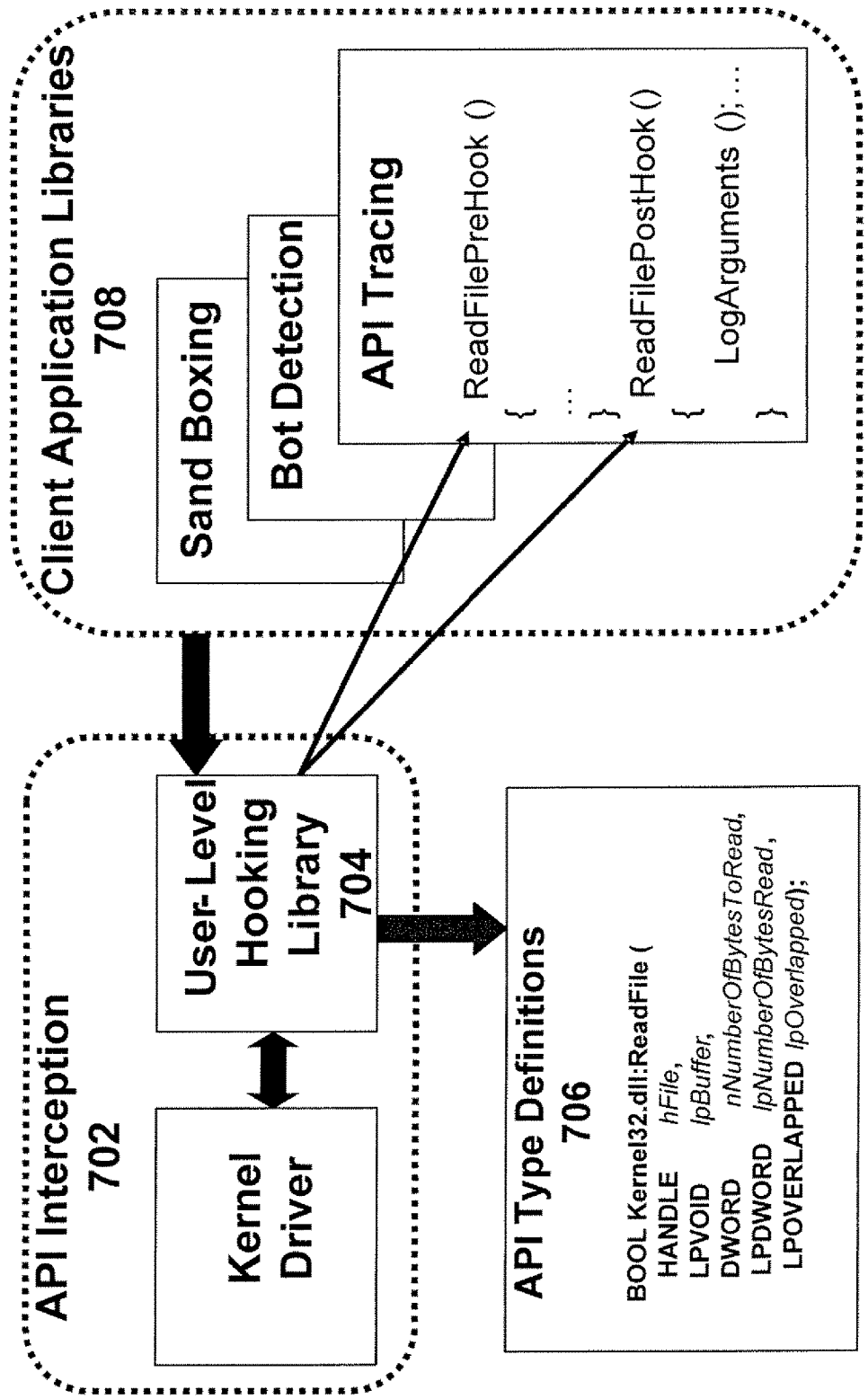
FIG. 7 depicts a block diagram for API tracing in accordance with an embodiment of the present disclosure.

FIG. 7 depicts a block diagram for API tracing in accordance with an embodiment of the present disclosure. As illustrated, API Interception 702 may provide a framework for intercepting API calls in order to provide a trace. API Interception 702 may provide pre-hook functions and/or post-hook functions. User-level hooking library 704 may use client application libraries 708 for API tracing, sand boxing, and BOT detection. User-level hooking library 704 may use API Type Definitions 706 to identify different types of APIs to trace.

At this point it should be noted that classifying non-process threats in accordance with the present disclosure as described above typically involves the processing of input data and the generation of output data to some extent. This input data processing and output data generation may be implemented in hardware or software. For example, specific electronic components may be employed in a non-process threat classification module or similar or related circuitry for implementing the functions associated with non-process threat classification in accordance with the present disclosure as described above. Alternatively, one or more processors operating in accordance with instructions may implement the functions associated with non-process threat classification in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer-implemented method for improving classification of non-process threats to computers comprising: generating, using a trace component operating within a non-process threat classification component module stored in computer memory, trace data of at least one observable event during execution of a process by an interpreter, wherein generating trace data comprises using context information to identify execution information associated with the at least one observable event; identifying, using at least one computer processor, a script file associated with the process executed by the interpreter, wherein the script the is identified using command line arguments provided during the execution of the process; associating the trace data with the script file; representing, using a feature representation component operating within the non-process threat classification component module, a first feature of the at least one observable event of the trace data; calculating, using a similarity evaluation component operating within the non-process threat classification component module, a similarity between the first feature and at least one sample feature of a known non-process threat; and classifying, using the similarity evaluation component, the script the as a non-process threat based on the similarity.

2. The method of claim 1, wherein representing the first feature comprises generating a feature vector.

3. The method of claim 2, wherein the trace data of the at least one observable event comprises n-gram data.

4. The method of claim 2, further comprising:
tracing observable events of a thread injected by a process;
generating a second feature vector of the injected thread using n-grams associated with observable events of data of the tracing of the observable events of the injected thread; and
calculating a combined feature vector combining the first and second feature vectors.

5. The method of claim 4, wherein a Euclidean distance is calculated using the combined feature vector.

6. The method of claim 1, wherein the similarity comprises an Euclidean distance.

7. The method of claim 1, wherein representing the first feature comprises a set of elements including operating system operations and objects; and wherein the similarity comprises a Jaccard index.

8. The method of claim 1, further comprising:
associating the trace data with a hash of an executable of the process.

9. The method of claim 1, wherein a Dynamic Linked Library (DLL) is hosted by the process.

10. The method of claim 9, wherein the generated trace data of the at least one observable event associated with execution of a process is executed within a context of the DLL.

11. The method of claim 10, further comprising:
determining the context of the DLL by traversing an execution stack to verify that a return address on the execution stack corresponds to virtual address space associated with a code section of the DLL.

12. The method of claim 9, wherein the DLL is loaded by an Operating System (O/S) utility.

13. The method of claim 12, wherein the operating system utility comprises at least one of: svchost.exe and rundll32.exe.

14. The method of claim 9, further comprising:
obtaining information about the DLL using at least one of: a command line argument and a registry setting; and
associating the generated trace data with the DLL.

15. An article of manufacture for improving classification of non-process threats to computers, the article of manufacture comprising: at least one non-transitory processor readable medium; and instructions stored on the at least one medium; wherein the instructions are configured to be readable from the at least one medium by at least one computer processor and thereby cause the at least one computer processor to operate so as to: generate, using a trace component operating within a non-process threat classification component module stored in computer memory, trace data of at least one observable event during execution of a process by an interpreter, wherein generating trace data comprises using context information to identify execution information associated with the at least one observable event; identify a script the associated with the process executed by the interpreter, wherein the script the is identified using command line arguments provided during the execution of the process; associate the trace data with the script file; represent, using a feature representation component operating within the non-process threat classification component module, a first feature of the at least one observable event of the trace data; calculate, using a similarity evaluation component operating within the non-process threat classification component module, a similarity between the first feature and at least one sample feature of a known non-process threat; and classify, using the similarity evaluation component, the script the as a non-process threat based on the similarity.

16. A system for improving classification of non-process threats to computers comprising: a computer memory; and one or more computer processors communicatively coupled to a network; wherein the one or more computer processors are configured to: generate, using a trace component operating within a non-process threat classification component module stored in the computer memory, trace data of at least one observable event during execution of a process by an interpreter, wherein generating trace data comprises using context information to identify execution information associated with the at least one observable event; identify a script the associated with the process executed by the interpreter, wherein the script the is identified using command line arguments provided during the execution of the process; associate the trace data with the script file; represent, using a feature representation component operating within the non-process threat classification component module, a first feature of the at least one observable event of the trace data; calculate, using a similarity evaluation component operating within the non-process threat classification component module, a similarity between the first feature and at least one sample feature of a known non-process threat; and classify, using the similarity evaluation component, the script the as a non-process threat based on the similarity.

\* \* \* \* \*